March 26, 1957   J. D. COLE   2,786,624
SUB-ASSEMBLY FOR ELECTRIC MOTOR FAN UNIT
Filed March 24, 1955   2 Sheets-Sheet 1

INVENTOR.
JAMES D. COLE
BY
ATTORNEYS

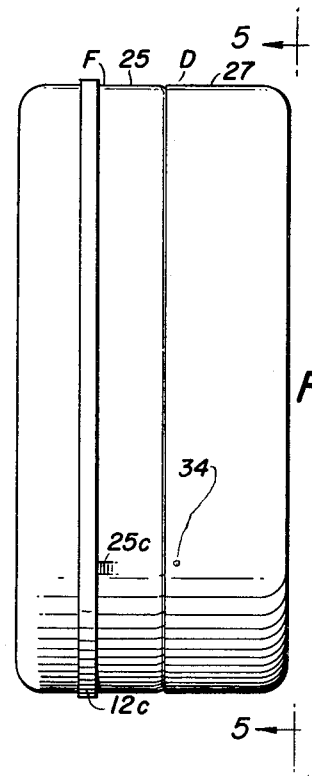
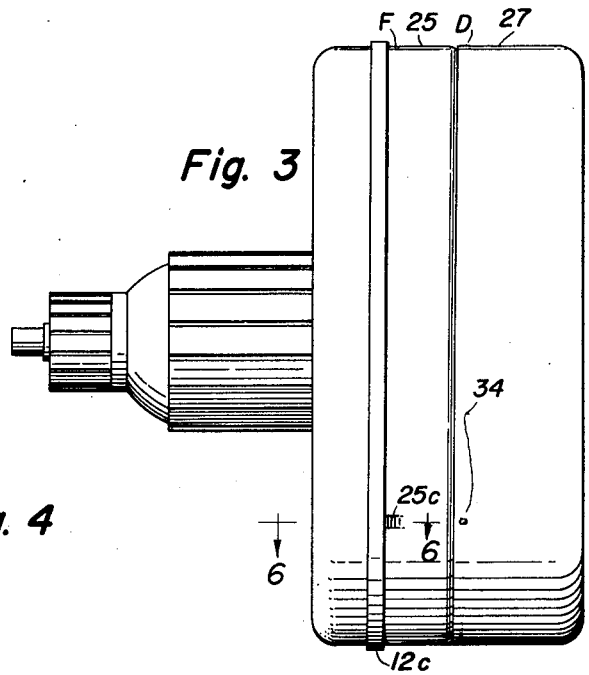
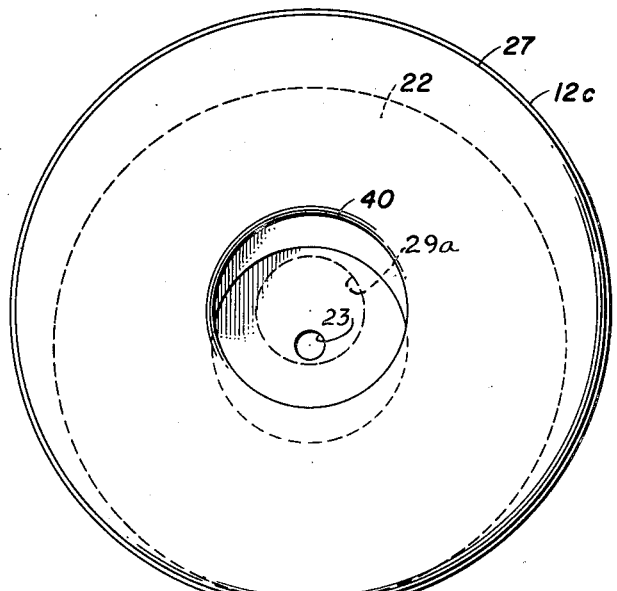
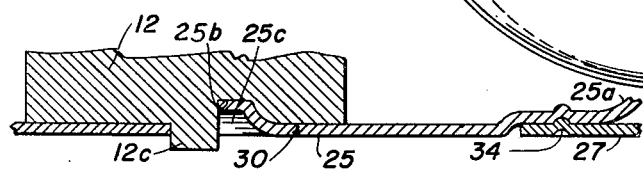
INVENTOR.
JAMES D. COLE
ATTORNEYS

United States Patent Office 2,786,624
Patented Mar. 26, 1957

2,786,624

SUB-ASSEMBLY FOR ELECTRIC MOTOR FAN UNIT

James D. Cole, Kent, Ohio, assignor, by mesne assignments, to The Lamb Electric Company, Kent, Ohio, a corporation of Delaware Application March 24, 1955, Serial No. 496,562

1 Claim. (Cl. 230—117)

This invention is directed to improvements in motor multistage fan units particularly adapted for use in tank type portable vacuum cleaners.

Tank type vacuum cleaners usually have a motor and fan unit mounted within the dust and dirt collecting tank in such manner as to divide generally the interior of the tank into high and low pressure chambers with the stage fans disposed in the vacuum or intake end of the tank. The mounting of the unit is such that the unit may be removed for servicing purposes. The fan housings usually comprise cup shaped shell members arranged in a telescopic fit upon each other and upon an annular motor frame member. Various ways of maintaining the assembled positions of the cup shaped fan housing members have been tried such as slot and pin bayonet lock connections, clamping screws and light press fits. When bayonet lock connections were used sufficient looseness of the telescoped surfaces had to be present to permit relative turning of the housing members to effect the lock. This play or looseness permitted leakage of air with resultant loss of vacuum; and further the very construction involved costly fabricating operations. The same conditions prevailed when clamping screws were used with the added disadvantage that the inward projections of the screws tended to accumulate threads and lint thus interfering with efficiency of air flow.

When the fan housing members were lightly press fitted together difficulty of removing the motor armature and shaft was encountered when it was desired to service the commutator or armature bearings. Also the matter of reassembly was difficult and irksome. I have determined that in a motor multistage fan unit considerable separating pressures are exerted upon the cup shaped telescoped members which in a standard sized unit may amount to a separating pressure of 35 pounds exerted on the connection between the second stage housing and the annular motor frame member and a force of about half that much at the telescoped connection between the first and second stage fan housings.

The general object of the present invention is to so construct the fans, mountings and housings therefor in such manner that a permanent assembly of the housing units may be effected, while the fans may remain in their housing when the armature shaft is removed therefrom for servicing purposes.

More specifically the object of the present invention is the provision of a permanent fan housing and fan enclosing arrangement which will permit of the ready reassembly of the armature shaft, its bearing and the fans and spacers while avoiding the necessity of opening the fan housing structures.

Other objects of the invention will become apparent from the following description referring to the accompanying drawings showing an embodiment thereof. The essential characteristics are summarized in the claims.

In the drawings Fig. 1 is a vertical, diagrammatic showing of a vacuum tank and motor multistage fan unit supported therein;

Fig. 3 shows the unit of Fig. 2 with the brush end of the motor frame and field structure removed;

Fig. 4 shows the fan and housings with the armature shaft removed;

Fig. 5 shows an end view of the disassembled parts Fig. 4; and

Fig. 6 is a fragmentary cross section taken in an axial direction of connections between the motor frame and the fan housing 5.

Figure 1:
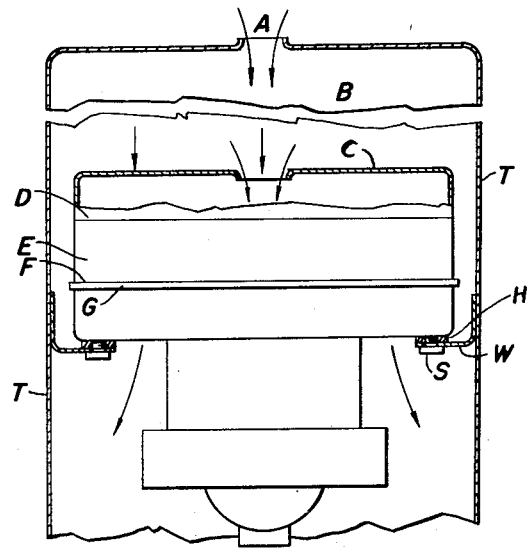

Referring to the diagram of Fig. 1, T represents the tank of a tank type vacuum cleaner with a motor multistage fan unit supported therein on an annular wall or ledge W sealed to the tank wall and to the fan housing structure. A is the inlet orifice of the tank to suction chamber B. Considering a typical installation, when the unit is mounted as shown in Fig. 1 and with the inlet opening A sealed, a vacuum of about 2¼ pounds per square inch will be produced by the unit. As a result of this partial vacuum in chamber B together with the internal pressures created by the fans in the fan chambers, there is found to be a pull of about 35 pounds tending to separate fan housing E away from motor frame member G at connection F. Also there is a pull of about 17½ pounds tending to pull first stage housing C away from housing E at connection D. Furthermore there is a pull of approximately 50 pounds tending to pull the entire motor unit away from seal H.

To eliminate the difficulty present at the shell and housing connection F, I eliminate the type of construction which for servicing of the unit required the steps of separating the motor frame member supporting the housing shells from the housing shells and from each other by effecting permanent air tight connections between these members. I so arrange the construction of the fan members and spacer members that the end of the armature shaft upon which the fans and spacer members are mounted can be withdrawn or slipped out of the assembly at the time the unit is being serviced and whereby the armature shaft with its bearing may be reinserted into the assembly comprising fans and spacer members.

Figure 2:
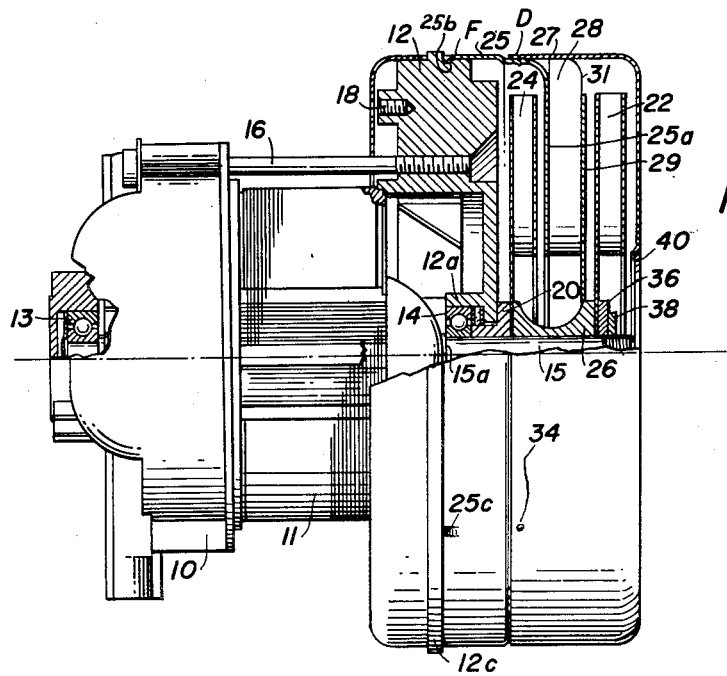
Figs. 2 shows a side elevation of the motor and fan unit horizontally positioned and partly in section, the lower half of the figure being viewed from a position rotated about the axis roughly forty degrees from that of the upper half.

In Fig. 2 I have illustrated a multistage motor fan unit such as is described and claimed in my Patent #2,713,455 but modified to the extent required for the fulfillment of the present purposes. The unit generally comprises a motor frame brush carrying member 10, a laminated field structure 11 and a supporting frame member 12. The frame members 10 and 12 support respectively the bearing mechanisms 13 and 14 and these bearing mechanisms support the ends of an armature-carrying shaft 15. The two frame members are held in clamped relation to the laminations of the field structure by external bolts 16. The frame member 12 is provided with threaded boss sockets 18 for the reception of mounting bolts S (see Fig. 1) for gasket clamping of the unit to the baffle ring W.

The frame member 12 is provided with a socket structure 12a into which the outer race of bearing mechanism 14 is slip fitted. The inner race abuts a shoulder formed on the armature shaft 15 and is held there by a spacer clamping member 20 which is a flanged sleeve shaped to extend through a confining central opening formed in the frame member 12. Mounted upon the armature shaft end 15 are a second stage fan 24 and a first stage fan 22 having central apertures 23 (as seen in Fig. 5 for the fan 22) close fitted but slidably fitted on the shaft 15. A spacer clamping member 26 determines the axial spacing of the fans and the width of an inflow duct between the two fan stages.

The fan chambers are formed by two drawn cup shaped shells or fan housings 25 and 27 which are telescoped and press fitted or held by indenting the metal at the telescoped area as at 34; and the resultant two stage housing structure is mounted on the frame member by telescoping or fitting the cylindrical open end of the shell 25 upon an annular seat 30 formed on the motor frame member 12. Supported on the radial wall 25a of the housing member 25 are vanes 31 which support a radial wall 29 forming a radial airduct structure between the two stages; and this wall 29 has a central aperture 29a determined in diameter to suspend the spacer clamping member 26 when the armature shaft is withdrawn from the assembly for servicing purposes.

The outside diameters of the fan structures are such that when the armature shaft is withdrawn therefrom the central openings thereof will be exposed in an axial direction through the intake opening 40 of the primary fan housing 27 as shown in Fig. 5. The central opening of the fan 24 beyond fan 22 will be axially available through the opening 29a in the wall 29 as will be noted in Fig. 5 and the spacer members 20 and 26 will be suspended respectively by the frame 12 and radial wall 29.

To assure a permanent connection between the motor frame member 12 and the fan housing member 25 (see Fig. 6) I provide an annular groove 25b at the shoulder 12c location of the frame 12 so that after the annular part of the cup shaped housing member 25 has been closely fitted or telescoped onto annular surface 30 the overhanging end of the member 25 may be staked or inset as at 25c thus effecting a permanent sealed connection between the motor frame and housing.

Thus the fan housing shells remain permanently enclosing the fan members when the armature shaft is withdrawn upon removal of the nut 38 and clamping washer 36 and the spacer members remain within the shells as above described.

I claim:

In a multistage motor fan unit for vacuum cleaners, a sub-assembly comprising an annular bearing-supporting motor frame member, an armature shaft bearing mechanism supported by said frame member, an armature shaft extending through said bearing, a two stage fan housing structure telescopically mounted on the frame member comprising two cup shaped fan housing members telescopically fitted together to form first and second fan chambers with a walled air duct structure therebetween, said air duct being formed by a centrally apertured disk wall supported on inwardly extending air guide vanes secured to the radial wall of the fan housing cup member mounted on the motor frame member, said motor frame member having an annular groove therein underlying the end of the fan housing cup member telescopically mounted thereon and said end being indented into the groove to form a permanent connection between the frame member and said fan housing cup member, disk fan members permanently disposed in the said first and second fan chambers, spacer clamping members slidable on the armature shaft extension disposed to clamp said fan members on the shaft by an axially directed clamping thrust thereon, one of said spacer members being adapted to be loosely supported by said motor frame member and the other spacer member by said disk wall when the armature shaft is withdrawn for servicing purposes and whereby the shaft may be thrust through said spacers and fans without necessitating opening of the permanently closed housing structures.

References Cited in the file of this patent

UNITED STATES PATENTS 2,422,860   Seyfried _____ June 24, 1947

FOREIGN PATENTS 811,248   France _____ Apr. 9, 1937